(12) United States Patent
Frew

(10) Patent No.: US 8,794,680 B2
(45) Date of Patent: Aug. 5, 2014

(54) APPARATUS FOR PREPARING KNOTS AND ITS METHOD OF USE

(75) Inventor: David Bruce Frew, Hamilton (NZ)

(73) Assignee: Tytaz Holdings Limited, Hamilton (NL)

( * ) Notice: Subject to any disclaimer, the term of this patent is extended or adjusted under 35 U.S.C. 154(b) by 0 days.

(21) Appl. No.: 13/575,254

(22) PCT Filed: Jan. 27, 2011

(86) PCT No.: PCT/NZ2011/000006
§ 371 (c)(1),
(2), (4) Date: Jul. 25, 2012

(87) PCT Pub. No.: WO2011/093727
PCT Pub. Date: Aug. 4, 2011

(65) Prior Publication Data
US 2012/0326441 A1    Dec. 27, 2012

(30) Foreign Application Priority Data

Jan. 28, 2010    (NZ) .......................... 583005

(51) Int. Cl.
    *B65H 69/04*    (2006.01)
(52) U.S. Cl.
    USPC .......................................... 289/17
(58) Field of Classification Search
    USPC ................. 289/1.5, 2, 17; D22/134, 149
    See application file for complete search history.

(56) References Cited

U.S. PATENT DOCUMENTS

| 2,773,713 | A | * | 12/1956 | Smalley | 289/17 |
| 3,700,272 | A |  | 10/1972 | Bauer |  |
| 3,731,960 | A | * | 5/1973 | Pagano | 289/17 |
| 3,787,081 | A | * | 1/1974 | Macy | 289/17 |
| 4,400,025 | A | * | 8/1983 | Dennison | 289/17 |
| 4,403,797 | A |  | 9/1983 | Ragland, Jr. |  |
| 4,573,719 | A |  | 3/1986 | Aldridge |  |
| 4,607,869 | A |  | 8/1986 | Bersche |  |
| 5,240,295 | A | * | 8/1993 | Spencer | 289/1.5 |
| 5,690,369 | A |  | 11/1997 | Steck, III |  |
| 6,817,634 | B2 |  | 11/2004 | Champion |  |
| 7,419,195 | B1 |  | 9/2008 | Jochum |  |
| 7,494,162 | B1 | * | 2/2009 | Howell | 289/17 |
| D662,567 | S | * | 6/2012 | Frew | D22/149 |

FOREIGN PATENT DOCUMENTS

NZ    255008    12/1996

* cited by examiner

*Primary Examiner* — Shaun R Hurley
(74) *Attorney, Agent, or Firm* — Greer, Burns & Crain, Ltd.

(57) ABSTRACT

An apparatus for use in the preparation of a knot in at least one length of material, wherein the apparatus includes a base portion, the base portion including; a) a loop former configured in use to form an open loop in the length of material; and; b) at least one restraining device configured to restrain the length of material on the loop former, and wherein the apparatus includes a twister configured to intercept and twist at least two portions of the length of material.

23 Claims, 19 Drawing Sheets

STEP 3

STEP 4

APPARATUS FOR PREPARING KNOTS AND ITS METHOD OF USE

TECHNICAL FIELD

This invention relates to an apparatus of preparing knots and its method of use, and particularly in relation to the preparation of knots used for fishing lines.

BACKGROUND ART

Knots serve a number of purposes in day to day living. Whilst they are very useful in a range of circumstances, they can often be difficult to master, requiring dexterity, skill and patience.

In many circumstances, hand-tying knots can be cumbersome. For example, age can bring on a lack of control of fine-tune movements, often resulting in inadequately prepared or untrustworthy knots. For these and other reasons, numerous types of knot tying devices have been prepared in attempt to aid the tying of knots, improve reproducibility, and remove the difficulty which can otherwise be required in preparing knots manually.

Knot tying devices are particularly relevant to the fishing industry, both recreational, and commercial, where a range of knots can be required depending on the circumstance. It is important that these knots can be prepared relatively easily, are reproducible, and impart the required level of integrity to the fishing line.

One type of fishing knot is called the dropper knot. The dropper knot is considered by some to be one of the most important knots in the fishing industry, and can be used for a number of purposes. For example, the dropper knot can be used for: the tag end of a braided or mono-filament line; preparing a double line on offshore trolling reels; preparing a shock leader for casting; attaching a hook; preparing fly leaders; or substantially any use requiring a reliable, strong knot.

When tied in a fishing line, the dropper knot typically can impart greater strength at the knot than the unknotted portion of the line. However, manual preparation of the dropper knot (and other types of fishing knots) requires a high level of dexterity, skill and control.

As for a bimini knot the fisher to use his/her hands and feet to tie the knot, and in some circumstances, often two fishers need to be involved due to the complexity of the knot. No doubt this can be very impractical, especially when on-board a fishing vessel where manpower and space can be limited.

In the April 2009 issue of the New Zealand Fishing News, an article demonstrated the most up-to-date method for manually preparing the dropper knot. This method, whilst not using a knot tying device, does describe a complex process to tie the knot utilising both the arms and legs of the fisher.

A number of devices have been made to aid in the preparation of knots in fishing lines.

For example, U.S. Pat. No. 4,871,200 describes a mechanical device capable of preparing two types of fishing knots, namely a dropper knot and an offshore swivel knot. The dropper knot is prepared using a complex system with a spool assembly and spinner assembly, each comprising mechanical components.

An offshore swivel knot is disclosed as being prepared using a U-shaped cavity in a device, five pegs, a slideable snap swivel and the complex use of the user's hands to both manipulate the line and provide tension to the line during the procedure. The need for the user's hands to provide tension while being able to manipulate the line can make it difficult to use. For example, when the device is used on board a fishing vessel, movement of the fisher due to a wave can result in the fishing line slipping in the device, leading to errors whilst preparing the knot.

The device described in U.S. Pat. No. 4,871,200 is bulky, which can be a disadvantage when attempting to store it on a fishing vessel with limited space. Furthermore, the mechanical components used for preparing the dropper knot are likely to add to the manufacturing costs (and therefore purchase cost) as well as to the weight of the device. Mechanical components can also be disadvantageous as they will be susceptible to damage caused by corrosion, which can be a particular problem out at sea.

Furthermore, mechanical componentry can require maintenance (servicing, repair or replacement of parts) and can be susceptible to general wear and tear, all of which can add to the maintenance cost of the device.

As a further example, U.S. Pat. No. 7,334,822 discloses a knot tying device which also requires mechanical parts such as a rotatable hook and geared twisting means. As discussed above, these types of components add to the overall complexity of the apparatus, increase the likelihood of malfunction and the need for repair.

Furthermore, mechanical parts can limit the range of knots able to be made with a given device. For example, the device disclosed in U.S. Pat. No. 7,334,822 is disclosed as able to make a dropper knot only. If a fisher requires a different knot, the user would then need to prepare this different knot by hand, or utilise an alternative knot tying device. As discussed previously, fishing vessels often have limited space, which restricts the space available for multiple knot making devices.

U.S. Pat. No. 7,334,822 also discloses that a constant pulling force is required from the user. This requirement can limit the ability of the user to carry out other tasks whilst the line is being tensioned.

It is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

Further aspects and advantages of the present invention will become apparent from the ensuing description which is given by way of example only.

DISCLOSURE OF INVENTION

According to one aspect of the present invention there is provided an apparatus for use in the preparation of a knot in at least one length of material, wherein the apparatus includes a base portion, the base portion including;

a loop former configured in use to form an open loop in the length of material when the length of material is wound around the loop former, wherein the loop former is configured to allow at least one portion of the length of material to be substantially adjacent to another portion of the length of material when wound around the loop former; and at least one restraining device is located on the base portion substantially adjacent to the loop former, wherein the restraining device, in use, is configured to restrain the length of material on the loop former.

According to a further aspect of the present invention there is provided an apparatus for use in the preparation of a knot in at least one length of material, wherein the apparatus includes a base portion, the base portion including;

a loop former configured to allow formation of a loop in the length of material, wherein the loop former includes an internal recess configured to allow the loop in the length of material to be internally accessible when wound around the loop former, and at least one restraining device configured to restrain at least one portion of the length of material to the loop former.

SUMMARY OF THE INVENTION AND ADVANTAGES

The apparatus and/or its method of use may provide the user with the ability to more easily prepare a range of knots such as those commonly used in the fishing industry.

For example, by using the current apparatus, the user avoids the involvement of additional persons or the need of both arms and legs to tie knots. Furthermore, the invention does not include any machinery, which avoids high cost in manufacturing, maintenance issues and mechanical faults which can be prevalent in currently used devices.

Also, the inventor identified that a multitude of knots may be formed from the single apparatus. This has significant advantages over already available mechanical knot tying devices which are typically limited to only one or two types of knot formation.

Furthermore, the quality and reproducibility of the knot prepared by the apparatus was found to be comparable or better than manually prepared knots.

Further advantages will be discussed throughout the specification.

Length of Material

Throughout the specification, the term length of material should be taken as meaning any elongated strand of material, such as (without limitation) a length of string, rope, cord, or fishing line.

The length of material may be a fishing line. Common examples of fishing line are made from nylon or braid, often used for trout, salmon or game fishing. While lines for trout and salmon fishing may utilise 2-6 pound breaking strength lines, game fishing may utilise upwards of 100 kg breaking strength (bs) lines. The present invention is not limited to use with any particular type of length of material or type of fishing line. However, for ease of reference, the remainder of the description and examples will refer to the length of material being a fishing line.

Base Portion

Throughout the specification the term base portion should be taken as meaning the base of the apparatus which may be configured to include other components of the apparatus, or to which the components are attached. The base portion may be of any convenient shape.

For example, the base portion may be substantially rectangular in shape. In one embodiment, the dimensions of the base portion are 175 mm (length)×155 mm (height)×7.5 mm (width). A more compact size may be preferable as the apparatus is likely to be installed by users on a fishing vessel where space is restricted.

In other embodiments, the base portion may be shaped as a profile of a fish head. An advantage of this configuration may be to provide aesthetic appeal, brand recognition and therefore commercial advantage. This embodiment exemplifies that the shape of the base portion will not overly impact on the function of the invention, and that alternative shapes to the base portion are not beyond the scope of the invention.

The base portion may include a receptacle configured to hold a lubricant.

This feature may be advantageous as the preparation of fishing knots may require a lubricant to avoid abrasion when twisting the line, and/or tightening the knot. Having a lubricant in a convenient location on the base portion helps to avoid the need to hunt for a separate container located away from the apparatus. If the base portion is shaped as a fish head, the receptacle may be located so as to represent an eye of the fish.

Additional receptacles may also be present on the base portion to house the twister and or hooking device (discussed further below). The inventor considers these receptacles may be conveniently located on the underside of the base portion. Clearly, additional receptacles may be present on the base portion to house other useful items such as hooks, swivels, teasers, etc. These should not be considered beyond the scope of the invention.

Preferably, the base portion includes a recess.

For example, if the base portion is substantially rectangular in shape as exemplified above, the mouth of the recess may be approximately 60 mm wide (along one side of the base portion) and approximately 110 mm in length (e.g. approximately ¾ of the height of the base portion).

Preferably, the recess is configured to extend into the base and at least partially bisect the loop former.

The recess may be substantially triangular in shape.

In this embodiment, the base of the triangular shaped recess forms the opening (or mouth) to the recess. An advantage of the recess is to provide easier access to a segment of the fishing line loop on the loop former on to the base portion. The advantages of the recess in the body portion will become more apparent with the ensuing description.

The base portion may include an attachment means. For example, the attachment means may be a clamp used to attach the base portion to an object such as a table or side of a boat. The ability to attach the base portion to a fixed object may help to facilitate easier use of the apparatus.

Loop Former

Throughout the specification, the term loop former should be taken as meaning any device or component on the apparatus capable of forming a loop from a length of material (e.g. fishing line) wherein at least one portion of the length of the material is substantially adjacent to one another portion of the length of material to complete the loop. The loop former (and hence the loop) may be square, oval, circular, triangular, or substantially any other shape so long as the loop of material formed by the loop former meets itself in at least one point around the loop former.

Preferably, the loop former is internally accessible. The advantage of this embodiment is that the loop may be able to be accessed from within, e.g. using a hook. This feature may be achieved in numerous ways.

For example, the loop former may consist of three protrusions spaced apart from one another (discussed further below). Winding a length of material around these three protrusions would provide a substantially open hollow loop.

Alternatively, the loop former may be made internally accessible simply by having a slit or cavity that allows a user to access the loop from within. Such examples are not intending to be limiting. After reading the present specification, a person skilled in the art would appreciate that that other options are available, all of which should be considered within the scope of the invention.

Preferably, the loop former includes a plurality of protrusions.

In a particularly preferred embodiment, the loop former includes three protrusions. For example, the inventor considers a particular preferred arrangement of the three protrusions is one protrusion located substantially above the apex of a triangular shaped recess, and the remaining two protrusions located to either side of the mouth of the recess.

In this embodiment, the fishing line, when wound around the three protrusions, passes over or through at least a portion of the recess. An advantage of this configuration is that a portion of the fishing line may be accessible from within the recess in the base portion. This allows easier manipulation of the fishing line to prepare the knots.

Preferably the protrusions are cylindrical-shaped pegs. The inventor considers the dimensions 26 mm (height)×12.225 mm (cross-sectional width) may be appropriate, although alternative dimensions are not beyond the scope of the invention.

In an further embodiment, the loop former includes a fourth protrusion, which may be rotatable upon a hinged axis point. As discussed further below, this additional protrusion may allow for alternative knotted loop configurations and sizes.

The inventor acknowledges that alternative loop formers may be used in the present invention. For example, a loop former may include a groove located in or around the base portion. Therefore, instead of protrusions (as a preferred example provided above), the fishing line loop may be formed by placing the length of the fishing line in a groove around the outer edge of the base portion.

In this embodiment, it may be preferable to have a region on the outer edge of the base portion that lacks the groove (e.g. in the form of a secondary recess). For example, the secondary recess may be the shape of a mouth in the fish shaped base portion. This secondary recess may be useful in aiding the removal of a portion of the fishing line during the method used to prepare the knot (discussed in detail later in the specification).

Restraining Device

Throughout the specification, the term restraining device should be understood to refer to any device configured to retain a portion of a length of material such that when the restraining device is activated there is no movement or slippage of the material through the restraining device.

Preferably, the restraining device is a clamp.

Preferably, the base portion includes two clamps. In this embodiment for example, one clamp may be positioned adjacent to both peripheral regions of the two protrusions closest to the mouth of the recess.

A clamp may be advantageous as the fishing line may then be easily locked in position before, during or after the fishing line is applied to the loop former.

A number of further significant advantages are provided by the inclusion of restraining devices on the apparatus.

For example, once a fishing line is applied to the apparatus and is secured using the clamps, the user may then completely remove all contact with the apparatus and fishing line without affecting the interaction between the line and apparatus. This means the user may attend to a different task after the fishing line has been applied to the apparatus, at which point he/she can return to complete the knot preparation.

The use of clamps also may help to quicken the overall procedure as it is much easier to manipulate the fishing line due to the clamp retraining the line with tension. Methods currently available in the art to prepare dropper knots can take up to five minutes or more and the user must maintain tension on the line using their hands. Such methods can be very tedious. The method using the apparatus of the present invention takes on average less than one minute to prepare a dropper knot, where a significant amount of time is saved by utilising the restraining devices.

Furthermore, using the retaining device means the user may be able to utilise their hands to manipulate the fishing line to produce a knot. In the prior art devices, it is often essential to hold at least one segment of the fishing line to prevent loss of the interaction between the apparatus and fishing line. Similarly, if the user unintentionally loses the tension on the fishing line (e.g. due to the impact of a wave), the fishing line may slip from the apparatus such that the process may need to be re-started to avoid a faulty knot being prepared.

Technically, the present invention requires only one clamp device, which may be used to secure two portions of the fishing line. Similarly, more than two clamp devices may be used in some circumstances, and use of multiple clamps on either side of the loop former should not be considered beyond the scope of the invention.

Preferably, the clamp includes a rotatable head portion and a locking portion. By forcing the rotatable head portion against the locking portion with a fishing line in between, the fishing line will be substantially restrained at that position.

Other types of restraining devices are not outside the scope of this invention. For example, substantially any type of clamp, clip or fastener, may be used to retain the fishing line. Furthermore, a notch in the base portion may be used to form a simple restraining device.

Twister

Throughout the specification, the term twister should be taken as meaning any rigid member capable of insertion between at least two adjacent lengths of material.

Preferably, the apparatus includes a twister.

Preferably, the twister is a cylindrical tube or rod. The inventor considers a cylinder shape to be appropriate to reduce the likelihood of the fishing line snagging during operation of the twister. Another advantage is that a cylindrical twister may be more easily removed after use than a twister of another shape.

Preferably, the twister has a cavity which extends its entire length.

The inventor considers the twister may be 91 mm (length)× 9.37 mm (width). These dimensions are considered appropriate as the twister may be easily handled and fit within the preferred recess in the body portion, where it is intended to be used. However, the inventor acknowledges that alternative dimensions and shapes of the twister are not beyond the scope of the invention.

The twister is a novel component of the present invention and provides considerable advantages over the prior art. The twister may be used to twist at least two adjacent fishing lines together, which is often a requirement in preparing knots such as the dropper knot. For example, if the dropper knot is instead prepared solely by hand, the twisting of the fishing line can be a strenuous and difficult task, and one which requires considerable skill. Instead, the twister, when used with the apparatus to prepare a knot, helps to address these issues, as the twister may be small and easy to use.

The preferred twister is a simple tool with no mechanical working parts, may be relatively cheap to manufacture, and may be resistant to breakage. The elongated cylindrical shape of the preferred twister may allow the user to rotate the twister with significant ease within the recess of the body portion. However, it should be realised that the twister may actually be the user's finger to manually twist the line. However, the inventor acknowledges the considerable difficulty this may impose on the user due to the full rotational twisting action required. Furthermore, the tension on the fishing line during the twisting action may cause significant pain (and potentially harm) to the user whilst twisting with their finger.

In comparison, the devices described in U.S. Pat. No. 7,334,822 require a mechanical spiralling mechanism which is used to achieve twisting of the fishing line. Whilst the overall set up disclosed in U.S. Pat. No. 7,334,822 for preparing the dropper knot is completely different than the apparatus of the present invention, the inventor stresses that the present invention is particularly advantageous as there is no need for mechanical components to twist the fishing line. As discussed previously, such mechanical components are prone to breakage, add to the cost of manufacturing, and reduce the amount of options available for knot preparation.

Without the twister, it would be difficult to twist the adjacent fishing lines upon one another while simultaneously providing an accessible pathway between at least two adjacent, twisted fishing lines (particularly when under tension). The twister may allow the user to efficiently twist the fishing lines, and also provide an easily accessible pathway between two adjacent twisted fishing lines.

Hooking Device

Preferably the apparatus includes a hooking device.

Throughout the specification, the term hooking device should be taken as meaning any physical means which is capable of engaging a portion of a fishing line and transferring it through a space formed between two separated (adjacent) fishing lines.

Preferably, the hooking device has an elongate body portion with a hook-shaped head.

The hooking device may also include a grasping portion to allow easier control and manipulation of the device in use.

Preferably, the hooking device is configured to be able to pass through the hollow twister.

The hooking device is advantageous as it may allow the user to pass the hooking device through the twister while the twister is engaged between the twisted fishing lines, "hook" a portion of the fishing line from the loop in the loop former, release the hooked portion of the fishing line from the loop former, and pull the portion of the fishing line through the hollow cavity in the twister.

Such manipulation of the fishing line is often required to form a number of fishing knots such as the well-known and frequently used dropper knot. The particular actions involved in preparing a number of knots with the apparatus are discussed further below and in the best modes section of this specification.

The inventor has discovered that the apparatus may be used for preparing a multitude of different knots, such as a Uni-Knot, a double strength Uniknot with braid, a teaser to a dropper knot. Each of these knots, and how they are prepared using the apparatus, is further described in the best modes section as examples only.

Some of these knots listed above (and described in the best modes) are practically impossible to achieve using currently available methods and devices.

Extension Device

Preferably, the apparatus includes an extension device configured to attach to the apparatus.

The extension device may improve the function of the main apparatus by helping a fisherman, whether skilled or amateur, to prepare a range of knots whilst aiding him/her to pause at any stage during the procedure to conduct other functions. Furthermore, the use of the apparatus and extension device do not require the user to use parts of their body other than their hands to secure the lines, and often will allow the user to use only one hand in the preparation of the knots.

Furthermore, the extension device also extends the use of the apparatus to the preparation of knots used in game fishing, such as the Bimini knot and Braid knot.

Therefore there may be a significant commercial advantage in the extension device as an entirely new target market is formed.

The extension device may be attached to the apparatus through numerous means. For example, the extension device may be attached to the apparatus by way of a rebated slot in the base of the apparatus (using a bolt to fix the extension device to the apparatus).

The extension device may be substantially any shape and attach in substantially any orientation to the apparatus. However, the inventors envision it may be advantageous for the extension device to extend outwardly to the left of the apparatus, when in use. This may allow easier use of the apparatus and extension device when preparing knots, especially for right handed people. Conversely, the extension device may be positioned to extend outwardly to the right of the apparatus, ideal for use by persons favouring their left hand.

Preferably, the extension device includes at least one protrusion configured to engage a portion of the length of material.

The protrusion located on the extension device may be configured to have a cross-section of less than 5 mm.

Most preferably, the cross-sectional width of the protrusion is approximately 2.25 mm.

The narrower width of this protrusion provides particular advantages. When in use (as described with the examples in the Best Modes section), it may enable knots to be made tighter than otherwise, especially for the Bimini knot and plait knot.

If the width of the protrusion on the extension device is of a similar width (or larger) than the protrusions on the apparatus (i.e. over 10 mm), the resulting knot formed using the protrusion on the extension device will form a hole of a similar width to that formed by the apparatus alone. This is disadvantageous for a number of reasons.

The protrusion on the extension device may be located on a raised platform. This may help the user to manipulate the length of material around the protrusion more easily than if the protrusion instead was simply attached to the surface of the extension device.

Although the platform may be of any shape, the inventors consider a circular shaped platform with no sharp edges to be particularly effective. Having no sharp edges may help to reduce chance of user injury, avoid snapping of length of material, and to continue the aesthetically "curving" motif which the apparatus and extension device are preferably configured to have.

Preferably, the raised platform includes at least one linear groove which passes substantially adjacent to the protrusion on the extension device.

The groove may run substantially the length of the raised platform, adjacent to the groove.

The groove provides a number of advantages. When the fishing line is pulled tight, it may be difficult to loop the fishing line under the fishing line (often a step in preparing knots with the extension device). With the groove running substantially adjacent to the protrusion, it is possible to insert the leading portion of the fishing line through the groove and under the portion of the fishing line held tight against the platform (the trace is typically held tight using a weight).

The extension device may include additional protrusions.

For example, the additional protrusions may provide beneficial points to rotate and secure the line.

The inventor envisions these particularly preferred embodiments (described above) may be particularly advantageous in the preparation of Bimini knots, Albright knot (for joining two lines together), and a plait knot. The methods used to prepare these knots using the apparatus and extension device are described in detail in the Best Modes section of the specification.

Such types of knots can be very difficult to prepare and there is no simple apparatus available which can be used to address the difficulties faced.

For example, a Bimini knot often requires the use of legs and/or hands of a fisherman together with both arms to prepare the knot. This leaves no available appendages for other functions. Indeed, once the preparation of a Bimini knot is commenced, the fisherman cannot easily pause the procedure (which can take upwards of 5 minutes) to conduct other functions required on a boat.

Method of Use

According to another aspect of the present invention there is provided a method of forming a knot in a length of material, utilising the apparatus as claimed above, characterised by the steps of:
(a) winding a length of material around a loop former to form at least one loop such that the material extends on either side of the loop former;
(b) restraining the length of material external to the formed loop on at least one side of the loop former with a restraining device,
(c) inserting a twister between two adjacent lengths of material in the loop,
(d) rotating the twister to form a twisted portion in the two lengths of material,
(e) releasing a portion of the loop from the loop former,
(f) drawing the released portion of the loop through the twisted portion,
(g) releasing the remainder of the loop from the loop former,
(h) drawing the remainder of the loop through the twisted portion;
(i) removing the twister; and
(j) pulling the loop to form a knot.

In a particular preferred embodiment, an extra fishing line is introduced before step a) of the method described above. The fishing line may be inserted such that a full length of fishing line passes between the two bottom protrusions and the loop former. In one embodiment, the fishing line may form a circle, and the slack in the circle may be retained with a weight.

The inventor has studied the dropper knot in detail and has found surprisingly that the main line stress and guillotine effect occurred in three places. He found, after considerable investigation, that introducing an extra line placed before the above procedure for forming the dropper knot was done, increased the strength of the knot substantially. This procedure is described in particular detail later in this specification.

Tests found that the knot without the extra line broke on an average of 65%-75% of the standard line strength. However, with the introduction of the extra line, tests showed a breaking strength of at least 95% strength of the main line. The inventor considers that the introduction of the infill line substantially helps to prevent the guillotine effect and stress imposed on the line due to tightening of the knot. This is considered, among other things, to provide a means that may reduce snapping, or abrasion of the main line during use.

A method of using the apparatus as described above is now further exemplified with regards to a preferred method of preparing a single dropper knot.

Step a) may be preceded by the step of adjusting the dimensions of the loop former. By adjusting the size of the loop former, the user may control the resulting size of the loop associated with the dropper knot, once formed.

For example, if the user wants to increase the size of the knotted loop, a fourth rotatable protrusion may be rotated about an axis such that the new position of the protrusion increases the overall circumference of the loop former, and subsequently the knotted loop formed.

In another example, a third protrusion (perhaps the top protrusion of a triangular shaped loop former) may be slidable in the plane of the base portion. By sliding the protrusion in a direction away from the other protrusions (and subsequently securing its new position), the overall perimeter of the loop former may be increased. Similarly, the perimeter of the loop former may be decreased by sliding the third protrusion downwards in the general direction towards the other two protrusions. Alternatively, a fourth protrusion at a fixed position is possible.

Preferably, the length of material in step a) is a fishing line.

Preferably, step a) involves forming just one loop (e.g. for preparing a standard dropper knot).

Alternatively, step a) involves forming two loops (e.g. for preparing a double dropper knot). A detailed description of how the double dropper knot is prepared using the apparatus is described in the best modes section.

The inventor wishes to stress the considerable advantages of the present invention in relation to preparing a double dropper knot. There are no currently available methods or devices that are able to make a double dropper knot or reinforcement knot. The inventor has found that the double dropper knot prepared using the apparatus and method may impart approximately two times the main line strength due to two loops being created.

This means that a fishing line with two pound strength may be used to prepare a dropper knot with twice the strength of the trace. Without this apparatus, the inventor considers it substantially impossible to prepare a double dropper knot as described.

No doubt, easy preparation of a double dropper knot has considerable advantages in the field of fishing, where the user may voluntarily increase the loop strength, depending on what type of fishing is undertaken. Remarkably, the inventor has found it typically only takes about one minute to prepare this double dropper knot and the reinforced dropper knot using the apparatus described above.

A person skilled in the art would acknowledge that any number of loops may be made in the preparation of a knot. The inventor has identified that two loops imparts sufficient strength to the fishing line for the majority of fishing requirements.

Additionally, the inventor has discovered that the knotted loop size may also be increased by winding the line a second time around two or more protrusions before completing the loop. This may be an alternative to an adjustable loop former.

Preferably, step b) includes restraining the fishing line at both ends of the loop using two restraining devices.

The inventor considers it may be advantageous to secure one end of the fishing line before forming the loop, and then secure the other end of the fishing line after formation of the loop. This is a preferred method when preparing the dropper knot.

Preferably, before the loop has been formed on the loop former in step a), the fishing line is restrained by one of the restraining devices or protrusions and twisted. The twisted line may then be applied to the loop former as described.

In the above embodiment, the line may be twisted approximately 6-8 times. The inventor found that once the resulting knot is prepared, the loop formed will already by twisted to help avoid an open loop. This has a number of advantages, including helping to avoid tangles in the line.

Optionally, a teaser may be fitted at the same time as inserting the twister.

The teaser may be added by placing the teaser alongside the twister prior to step d). Before the twister is removed, the user may place the head of the teaser adjacent to the twister, and then withdraw the twister. Then the user may tie off the teaser at the base with a half hitch knot, for example.

Preferably, step d) includes rotating the twister 4 to 14 times (each rotation being a 360° turn).

If the fishing line is braid, the inventor has found 8-10 rotations to be particularly preferable. If the fishing line is nylon, the inventor has found 6-8 rotations to be particularly preferable, as it has been found to impart increased strength to the knot. Less than this number of rotations may reduce the overall strength of the knot, and the knot may be more likely to slip. The inventor foresees additional double rotations may be made, but there is unlikely to be substantial benefit to the resulting knot's strength.

Step e) may include using the hooking device to release the portion of the loop. In a particularly preferred embodiment, the hooking device is inserted through the twister prior to releasing the portion of the loop.

Step f) may include pulling the portion of the loop back through the twister using the hooking device. In this embodiment, the hook shaped head on the hooking device may be able to effectively engage the fishing line and pull it through the hollow portion in the twister to form a loose dropper knot using this approach. The inventor has found the knotted loop will typically form at approximately 90° to the main line.

Following step f), the hooking device and twister may be removed from the apparatus. However, this step may be delayed until after step g).

Step g) may include releasing the fishing line from the remaining protrusions of the loop former.

Following step g), a lubricant may be applied to the loose dropper knot. The lubricant may also be applied prior to forming the twisted portion (step d). Lubricants may include water, soapy water, oil or any other fluid/gel/paste. An advantage of using a lubricant is to help with the action of tightening the knot and reduce or substantially eliminate friction of the main line. Reducing the friction of the main line may help to prevent damage caused to the main line which may otherwise weaken the line.

Optionally, a further knotted loop may be prepared by repeating the steps described above.

The inventor also considers it may be appropriate to slide a narrow elongated tube over the line near the end of the loop holding the hook. This may help to avoid breakage of the fishing line when a fish is hooked. It may also help to prevent the fish from physically biting through the line.

Example of Alternative Uses of the Apparatus

The inventor has identified that the apparatus may also be used surprisingly for preparing emergency ladders using 600 pound bs nylon. The connection of each step on the ladder may be formed using dropper knots prepared using the apparatus of the present invention. The inventor found the resulting knots in the ladder did not slip. As the dropper knot imparts such strength, it is possible to use nylon such as 600 pound bs nylon.

The inventor is aware that presently available emergency ladders are often heavy, bulky and take up a substantial amount of storage space. Instead, the knot apparatus can be used to prepare emergency ladders with dropper knots, wherein the material used reduces the amount of storage space, and is less heavy. As far as the inventor is aware, dropper knots have not been utilised to make emergency ladders, nor have emergency ladders been prepared from material such as 600 pound bs nylon.

Some Advantages of the Present Invention

Below may be some advantages of the present invention, which are given by example only:

- apparatus is relatively small and portable;
- apparatus and methods of use may be used by either amateur, professional or commercial fishermen;
- apparatus is simple and contains no mechanical parts, unlike many devices in the art;
- apparatus is reliable, which may increase reproducibility of the knot;
- a comparatively fast method of preparing knots and knotted loops—typically, a dropper knot will take less than 1 minute to prepare using the apparatus. This is in comparison to other techniques and/or devices that often take 5 minutes to prepare, sometimes unsuccessfully;
- the apparatus may be used as a light vice to hold hooks, swivels etc, such that it frees the hands to use for other purposes;
- provides ability to prepare non-slip knots, and form a knotted loop which can be thought of as a secondary line;
- if the secondary trace is broken, the main line may still remain intact;
- Methods may permit the use of a heavier trace line to be used on the secondary line (formed by the 90° loop);
- comparatively easy method to prepare dropper knot and other knots;
- the user may be able to use a lighter fishing line than one would normally use for a given fish, as the user can prepare a double dropper knot to increase the strength of the knot;
- the knots formed from using the present apparatus may create greater strength than the line itself. Normally, the weakest point on a line is the position of the knot;
- may reduce loss of hooks and sinkers, as the knot formed is less likely to come undone or break;
- may increase the ability to prepare a multitude of knots using the same apparatus;
- restraining device (e.g. clamps) allows freedom to use hands for other purposes;
- the apparatus acts as a "third hand" when preparing knots, adding fishing flies, traces and the like to the fishing line. This is particularly useful when the fisherman is working on an unsteady platform (e.g. small boat);
- resulting loop will invariably extend at approximately 90° from main line (reliability and reproducibility);
- may be used to include a teaser;

ability to make trace any size (e.g. due to adjustable loop former);

apparatus may include storing/retaining means for twister, hooking device, lubricant, hook and swivel such that they can be easily accessed when needed, and leave the hands free to set up line on the apparatus;

the apparatus may be shaped like a fish head to improve aesthetic appeal;

the extension device allows the user to perform an additional number of game-fishing knots, including:
Bimini knot; and
Plait knot;

the extension device may be easily attached or removed from the main apparatus as required;

the narrow width of the protrusion on the extension device allows tight knots to be formed;

the use of the clamps may assist in the use of the extension device; and the additional protrusion on the extension device is a handy point to rotate and secure the line.

BRIEF DESCRIPTION OF DRAWINGS

Further aspects of the present invention will become apparent from the following description which is given by way of example only and with reference to the accompanying drawings in which.

BEST MODES FOR CARRYING OUT THE INVENTION

The apparatus is configured to be a fishing jig (1) to be used for preparing knots in a fishing line, or multiple fishing lines.

Figure 1:
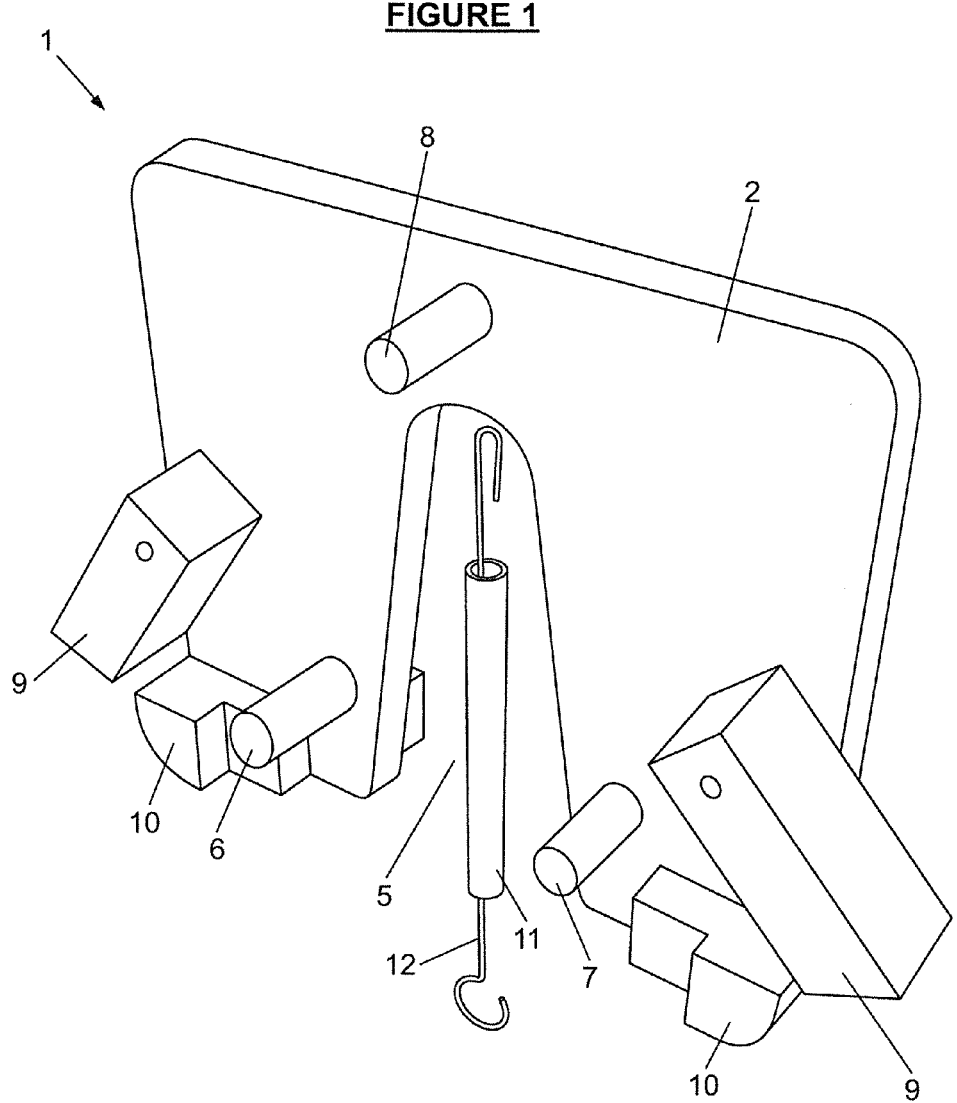
FIG. 1 a view of the fishing jig according to one embodiment with a preferred twister and hooking device.
Figure 2A:
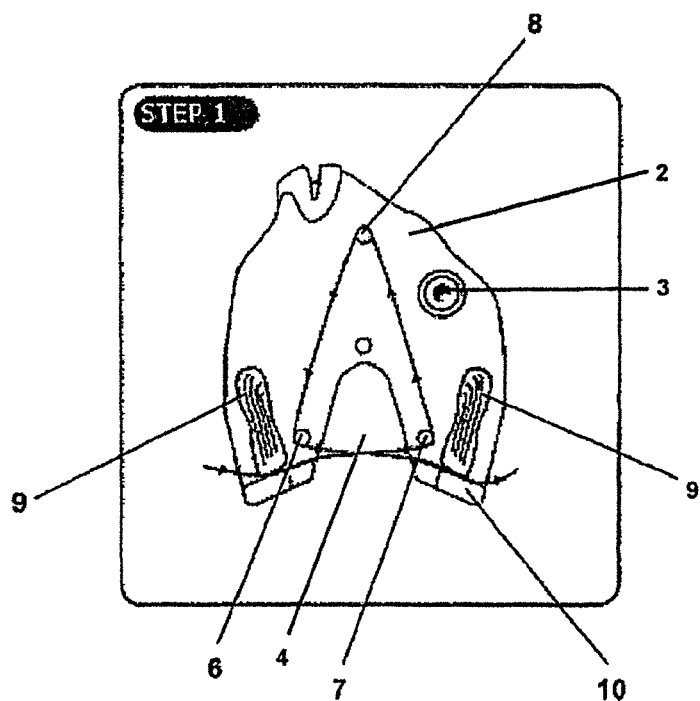
FIG. 2 a step wise representation of how to prepare a single dropper knot using the fishing jig according to a further embodiment of the present invention.
Figure 2B:
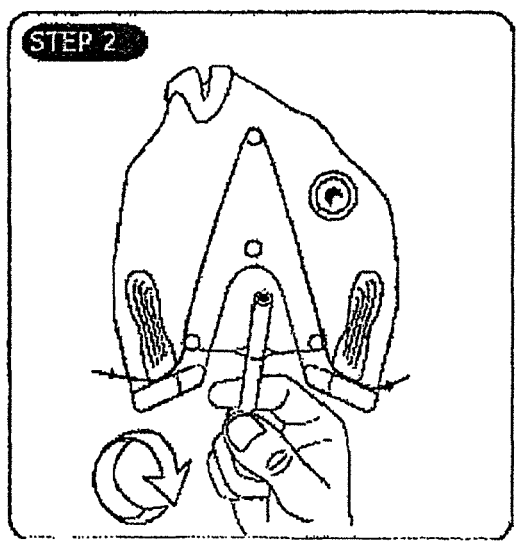
Figure 2C:
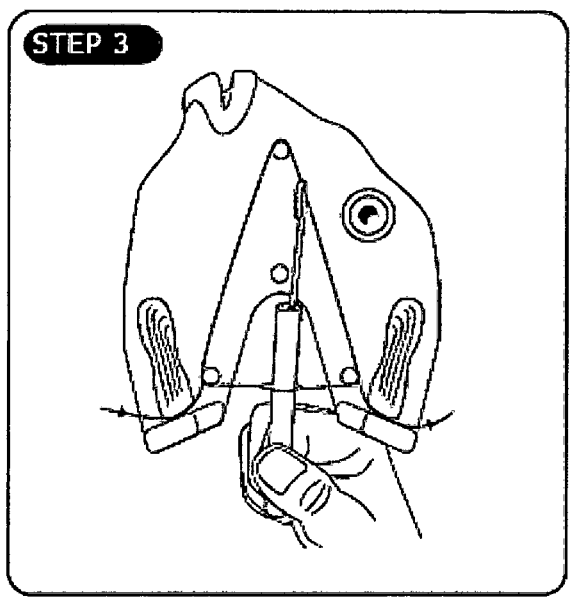
Figure 2D:
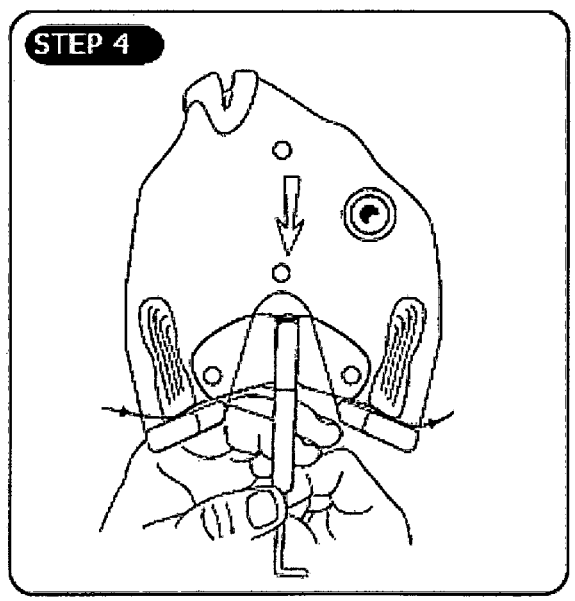
Figure 2E:
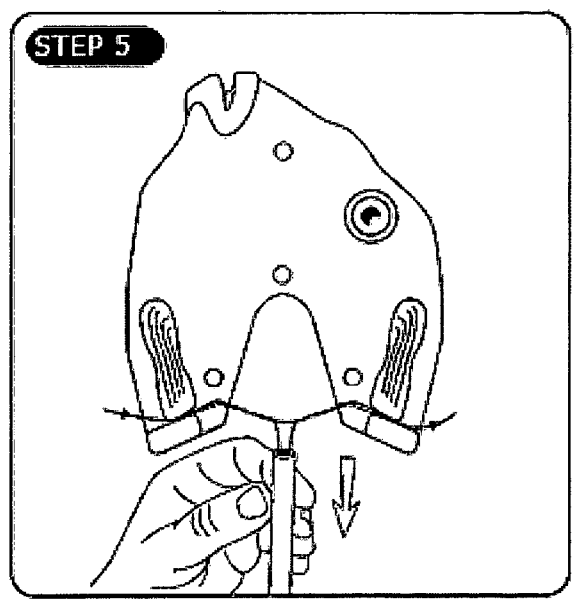
Figure 2F:
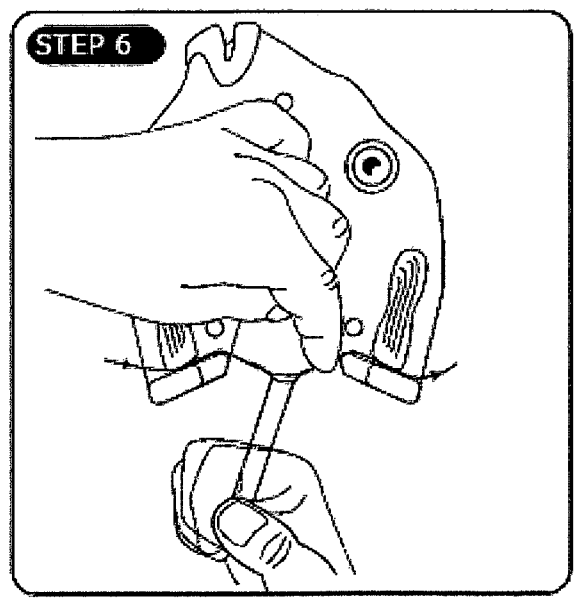
Figure 2G:
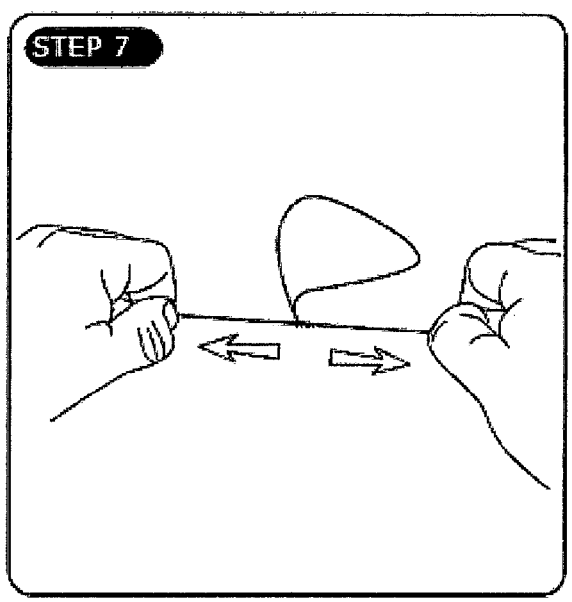
Figure 3A:
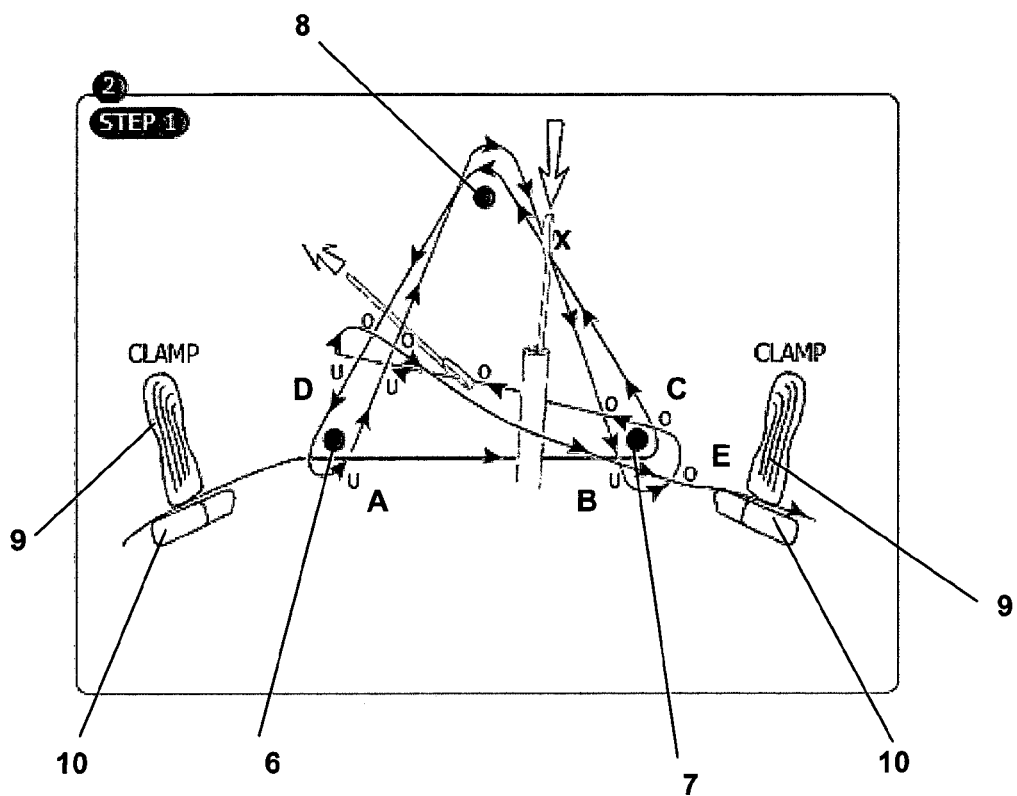
FIG. 3 a step wise representation of how to prepare a double dropper knot using the fishing jig according to a further embodiment of the present invention.
Figure 3B:
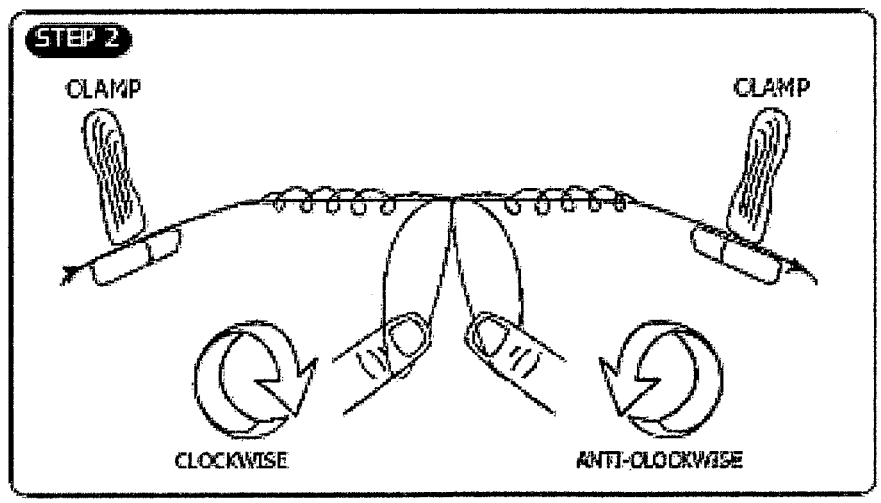
Figure 3C:
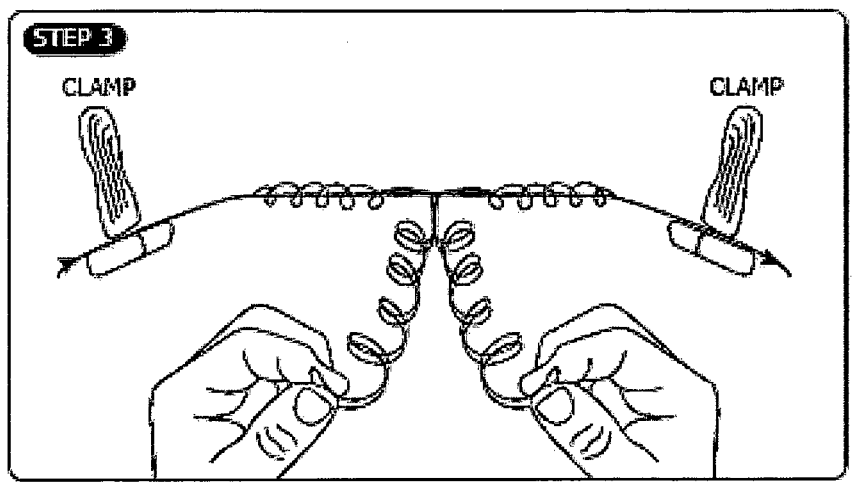
Figure 3D:
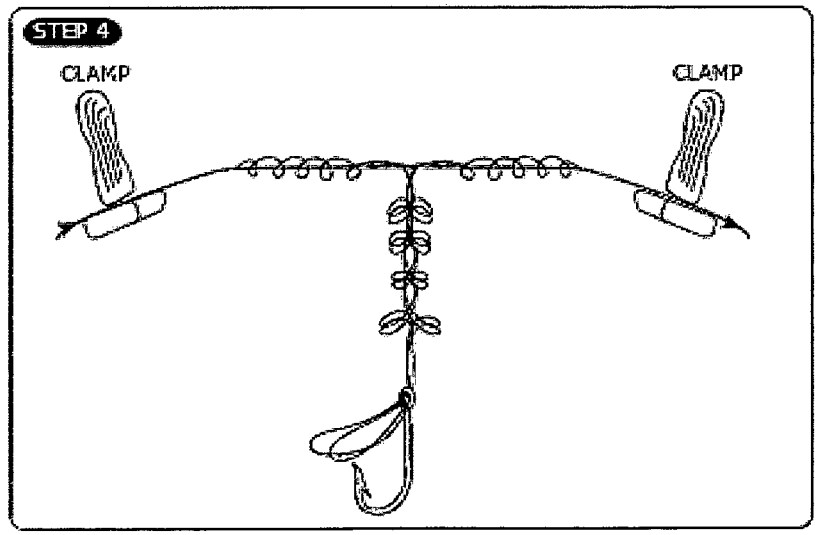
Figure 3E:
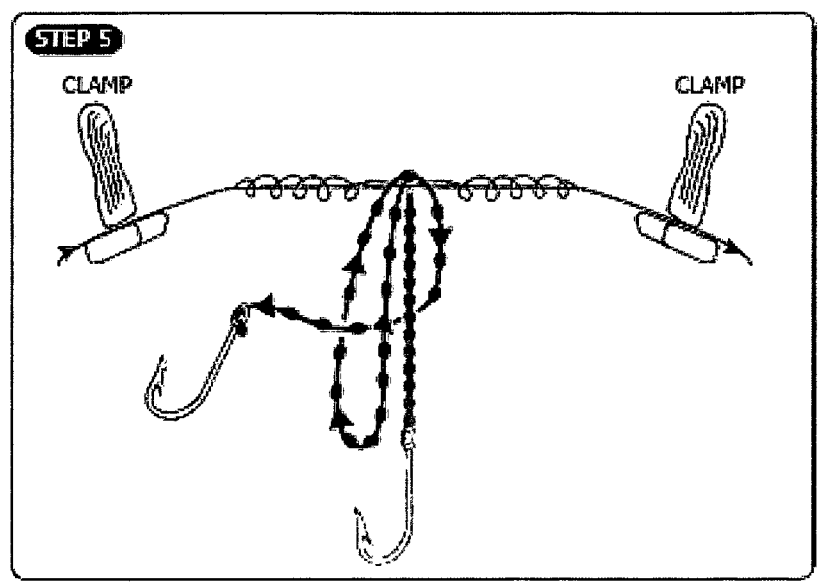

As shown in FIG. 1, one embodiment of the fishing jig (1) has a base portion (2) with dimensions 175 mm (length)×155 mm (height)×7.5 mm (width). In an alternative embodiment, the base portion may be shaped as a fish head.

The top side of the base portion includes a receptacle configured as a lubricant holder (3). The underside of the base portion includes two additional retainers for housing the twister and hooking device (not shown).

The base portion includes a recess (4) that is triangular in shape, wherein the base of the triangular shape forms an opening (5) to the recess. The mouth of the recess is 60 mm wide and the recess is 110 mm in length.

The base portion includes two screw holes which are configured to allow the fishing jig to be fixed on to an object such as a boat or bench, (not shown).

The base portion includes a loop former including three protrusions (6, 7, 8) arranged in a triangular configuration around the recess. Protrusion 8 is located above the apex of the recess, and the remaining two protrusions (6 and 7) are located near the mouth of the recess, approximately 28 mm from the bottom edge of the base portion. The protrusions are cylindrical in shape, with dimensions of 26 mm (height)× 12.225 mm (cross sectional width).

In a preferred embodiment, the loop former includes a fourth, adjustable protrusion. This position of this protrusion may be adjusted by rotating about a hingeable axis (not shown).

The base portion includes two retaining devices configured as clamp devices. The clamp devices include a rotatable head portion (9) and a fixed locking portion (10).

The fishing jig includes a twister (11) configured as a hollow cylindrical tube. The tube is 91 mm (length)×9.37 mm (width).

The fishing jig includes a hooking device (12) configured with an elongated body portion measuring 155.48 mm (length)×approximately 1.5 mm (width), a hook-shaped head portion measuring 14 mm (length)×4.11 mm (width) and a circular shaped grasping portion measuring 14.17 mm (length)×17.06 (width).

EXAMPLES OF KNOTS USING THE APPARATUS

Example 1

Single Dropper Knot (as Shown in FIG. 2)

Secure the fishing jig to an object
Place main supply line to your right
Clamp one end of the line to clamp 9 (on left side)
Feed the line on the exterior of protrusions 6-7-8, and then down past protrusion 6 and 7 again before clamping the remaining line with clamp 9 (on right side), making sure loop formed is tensioned.
Separate the two lines formed between protrusions 6 and 7 with the twister, and rotate the twister 360° (eight full rotations for braid, six full rotations for nylon).
Place the hooking device through the twister, hook up the line near protrusion 8, release line round protrusion 8 then drawing back the line into the twister.
Release the line held around protrusion 6 and 7.
Withdraw the twister and hooking device fully from the apparatus.
Place some lubricant on the loose line before pulling tight.
Use finger to slide knot to centre.
(If two lines are to be joined with dropper knot, the temporary knot (e.g. half hitch) is placed near the protrusion 8, such that the temporary knot is pulled through to form part of the trace which can then be cut off, leaving the dropper knot connecting the two lines.)

Example 2

Double Dropper Knot (as Shown in FIG. 3)

Follow the procedure described for the single dropper knot, but once past protrusion 6 for the second time, follow the steps below:
Pass line under (u) the fishing line at position A Pass line around exterior of protrusion 8
Pass line under (u) the fishing line at position B
Pass line around exterior of protrusion 7
Pass line over (o) fishing lines at position C
Pass lines under (u) fishing lines at position D, loop around and then feed line back over fishing lines at position D
Pass line over (o) fishing line at position E
Pass line past exterior of protrusion 7 and clamp on using clamp 9 (right hand side).
This leaves three lines to twist. Thread twister over—under—over the three lines. Rotate twister six times.
Place the hooking device through the twister, hook up two line near protrusion 8, drawing back the lines through the twister and out the other side.
Release remainder of loops complete withdraw.
Pull tight.
Use half hitch knot over dropper knot.
Place the left hand and right hand index fingers in the left and right loops respectively, rotating each of these loops in opposite directions approximately ten times (each rotation is 360°.
Place both loops though a hook (e.g., a fishing hook).
Place hook though a half hitch as shown and pull tight.

Example 3

Figure 4:
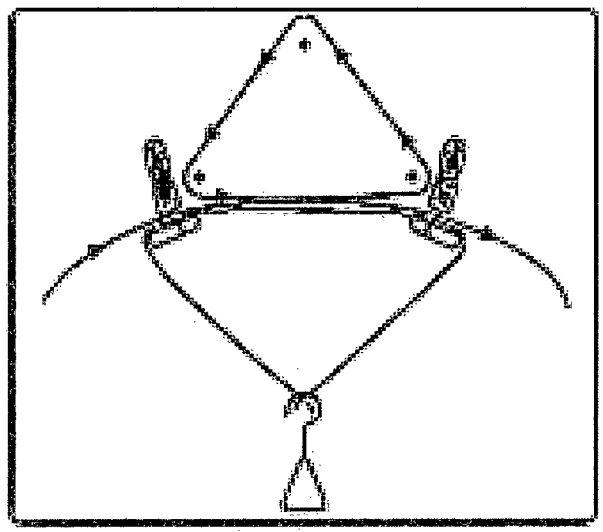
FIG. 4 an initial step in preparing a single or double dropper knot using the fishing jig according to a further embodiment of the present invention.

Reinforced Dropper Knot (as Shown in FIG. 4)

Using a fishing line, make a loop and place the loop between the two clamps 9.
Use a dead weight on a hook to keep the loose line out of the way and keep the tension of the line tight.
Follow procedures outlined in examples 1 or 2 to prepare a single or double dropper knot.
It is important to ensure that when passing the left hand pivot point, the line must be above the other two lines. When placing the twister between the top line and the bottom two lines, it is also preferred to rotate the twister six times only.

Example 4

Figure 5:
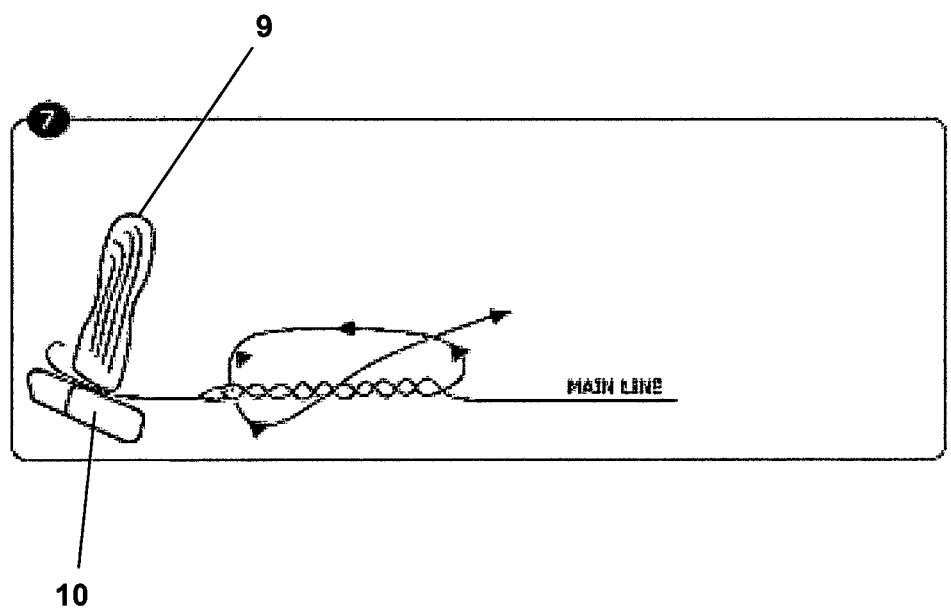
FIG. 5 a step wise representation of how to prepare a UniKnot using the fishing jig according to a further embodiment of the present invention.

UniKnot (as Shown in FIG. 5)

Place the fishing line through the eye of a hook held in left hand.
Hold the main line and tail in right hand.
Use your left hand to rotate the hook 360° three times.
Place hook in clamp 9
Take the tail line back over the twisted line and thread next to the hook, down under and back up under the loop you have just created twice.
Pull knot tight.

Example 5

Figure 6A:
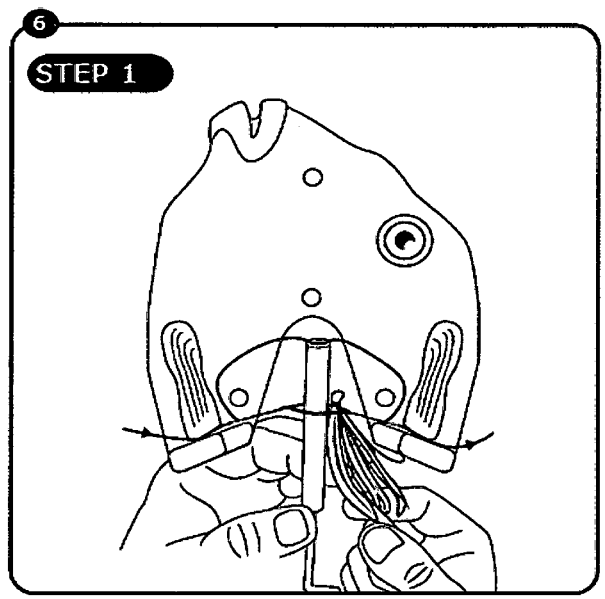
FIG. 6 a step wise representation of how to add a teaser to the dropper knot using the fishing jig according to a further embodiment of the present invention.
Figure 6B:
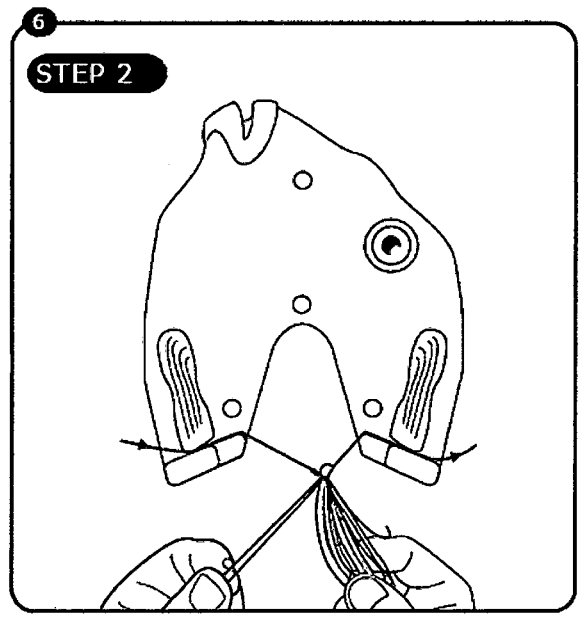
Figure 6C:
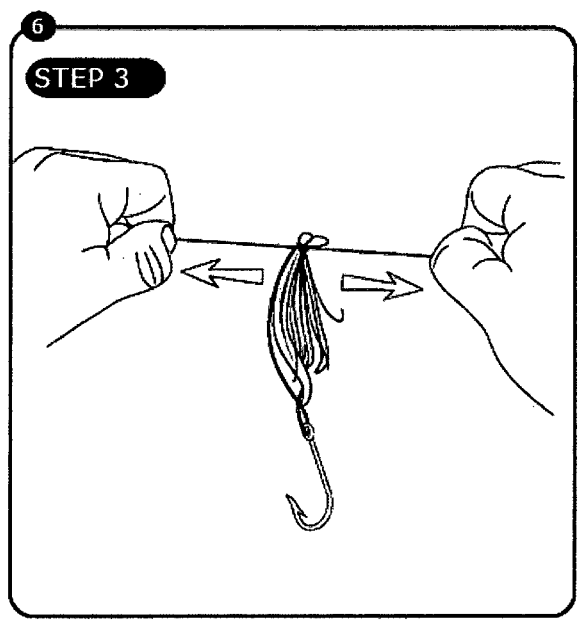
Figure 7A:
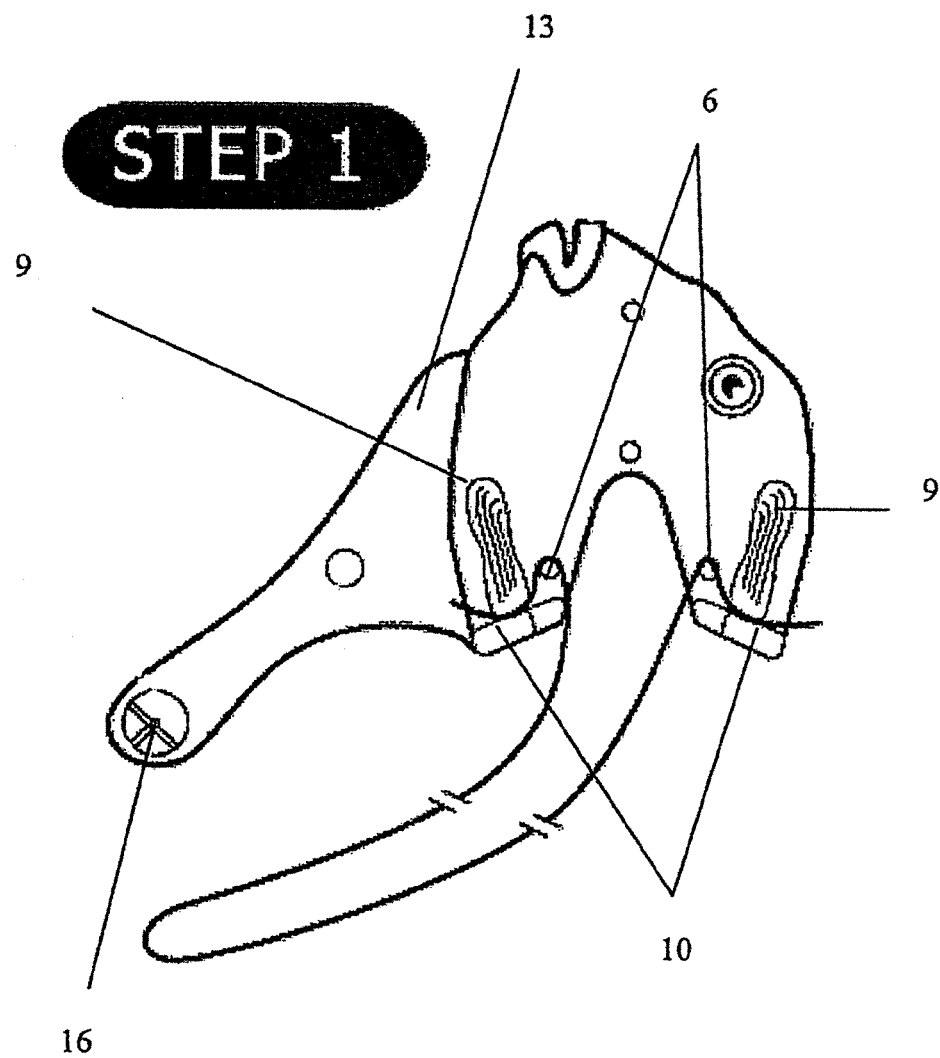
FIG. 7 a step wise representation of how to tie a Bimini knot.
Figure 7B:
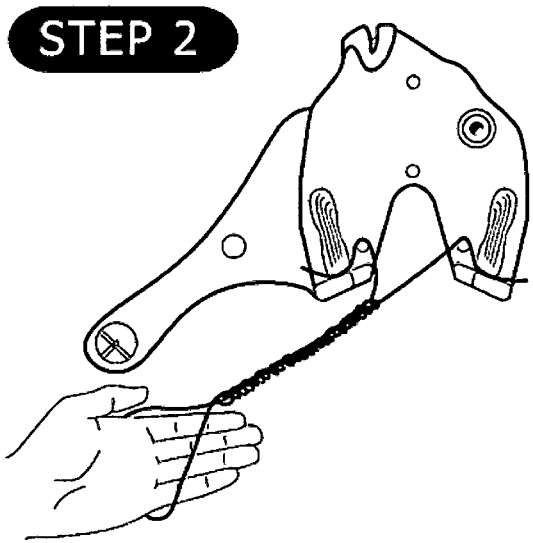
Figure 7C:
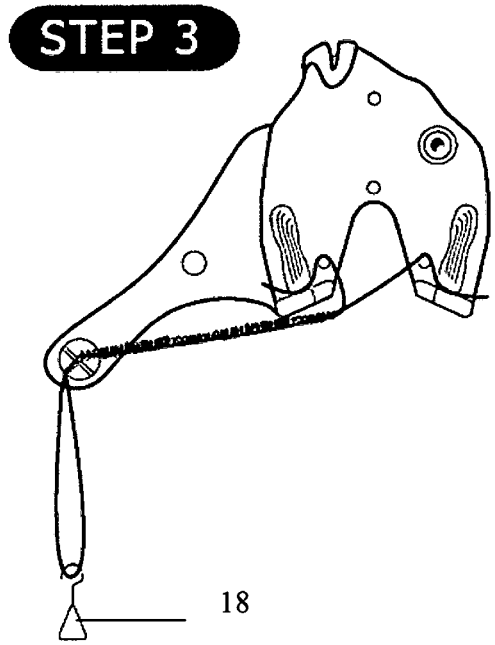
Figure 7D:
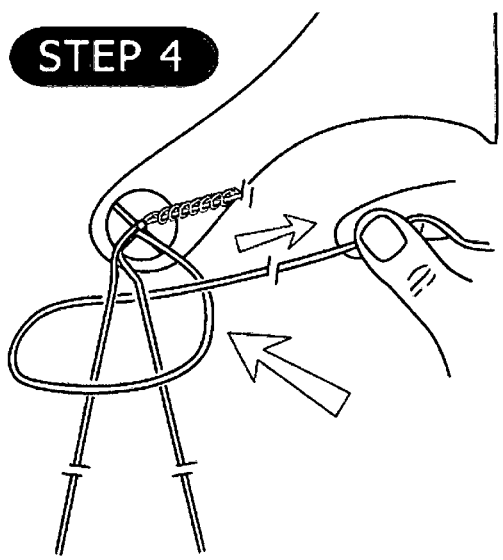
Figure 7E:
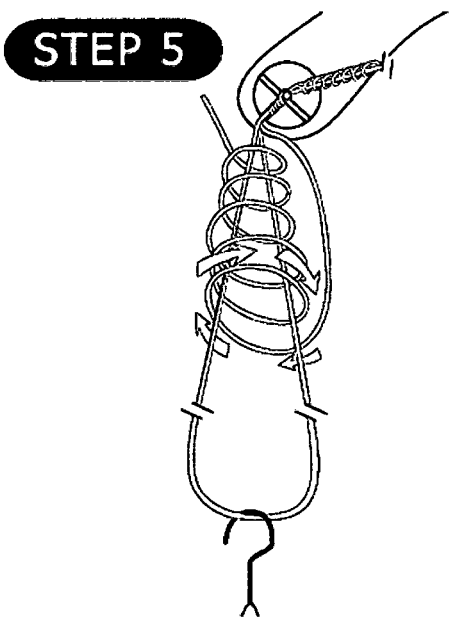
Figure 8:
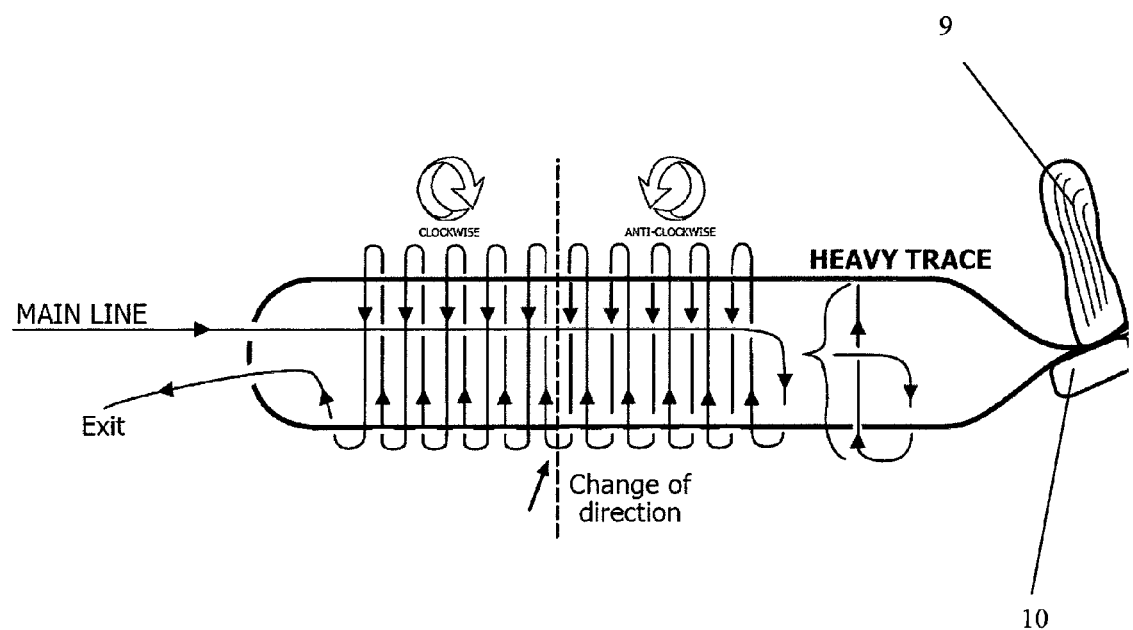
FIG. 8 a step wise representation of how to tie an Albright knot.
Figure 9A:
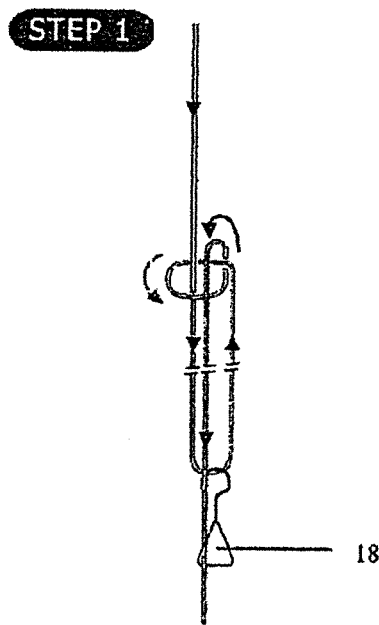
FIG. 9 a step wise representation of how to tie a Plait knot.
Figure 9B:
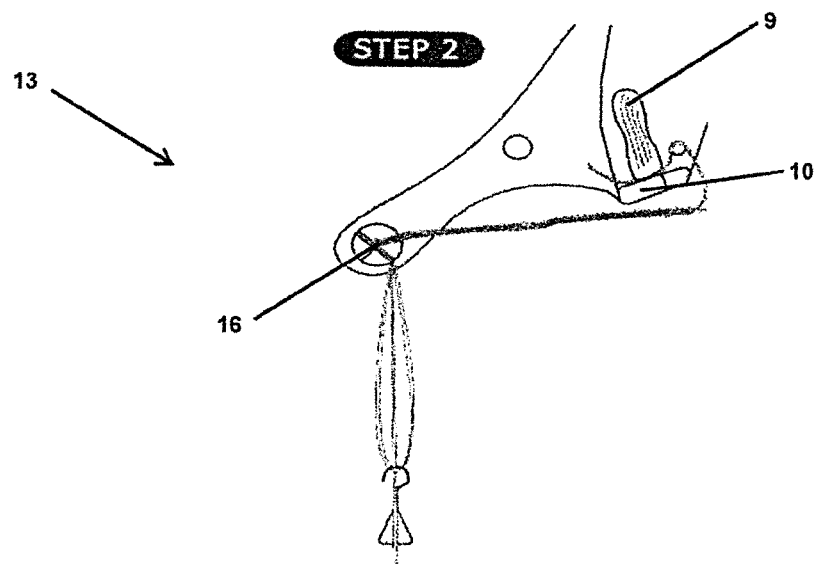
Figure 9C:
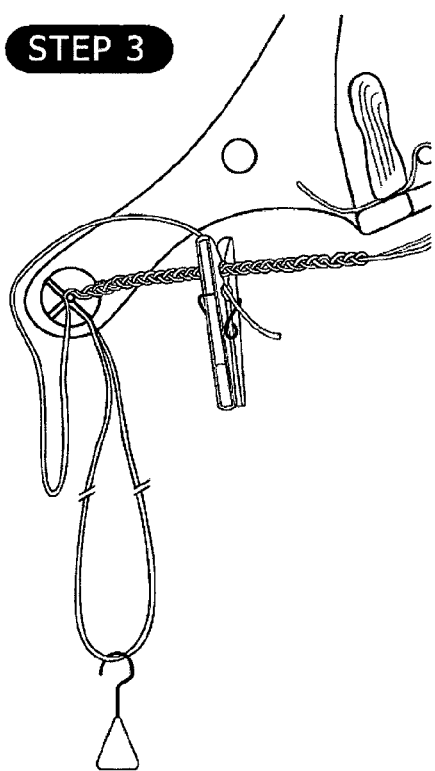
Figure 9D:
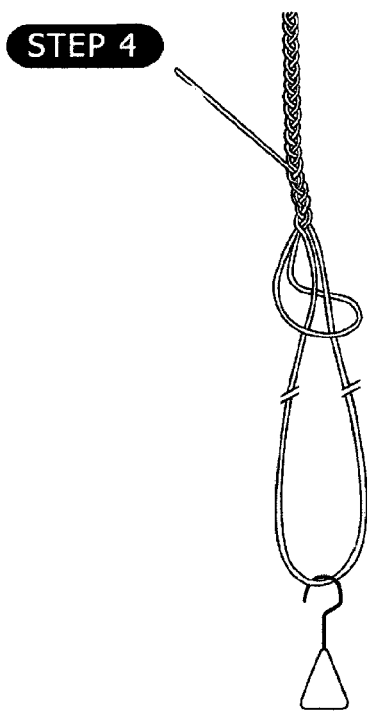
Figure 9E:
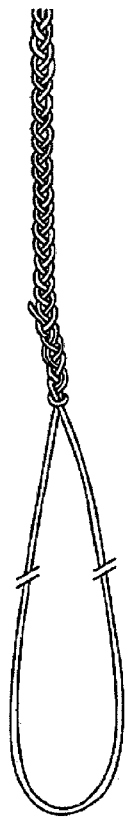

Adding a Teaser to the Dropper Knot (as Shown in FIG. 6)

Follow the dropper knot procedure to the point of creating a loop and securing the line in the clamps.
When placing the twister through the adjacent lines between the protrusions, place the teaser alongside the twister and proceed with remainder of steps taken in Example 1. Insert the head of teaser into the loop formed before the spacer has been removed. Hold the loop and teaser together with a device such as a spring loaded clothes peg, rubber band or tape. Pull the knot tight and then tie off at the base using a half hitch knot.

Example 6

Bimini Knot—for Game Fishing, Depending on how Long a Trace is Required

Take approximately 2-5 meters of main line
Place the left hand line around the left clamp (9) and secure.
Take the free end and do the same, leaving approx 200 mm tail and hold in right clamp (9)
Place your left hand in the loop formed and rotate it 25 times for nylon; 30 times for braid.
Place the loop in the groove on the left side of the extension device (13).
Take a dead weight (18) and secure it to the loop.
Place the twisted section over the 2.5 mm protrusion, configured as a pivot point (16) (the twisted section is now between pivot point (16) and the right hand clamp (9).
Now release the tail end in the right hand clamp (9) and pull firm, but not too tight. Keeping the tension firm, bring the line downwards towards the loop and slowly release the tension. This will allow the line to self wind itself down the twisted shaft, approximately a third of the way. At all times, keep this line tight—a second dead weight will help.
Now with your left hand rotate the tail line down over the main line several times until you are at the 2.5 mm pivot point (16).
Now pass the tail under the left two lines of the loop using the groove on the left side of the 2.5 mm pivot point (16) and do two half hitch knots—then pull tight.
To finish the knot do a UNI Knot over the loop, twisted internally 6-7 times for nylon; 8-9 times for braid.
Remove the surplus tail, leaving about 3-4 mm tail.

Example 7

Plait Knot

With a main line make a loop of approximately 1 meter long and place the dead weight (18) in it.
Bring the free end back a third of the way and hold with your forefinger and thumb of your left hand.
Next thread the loose end under and over the main line, under the new loop at the top, back over and down with the other two lines.
You now have three lines ready to plait.
Working from the left, take the outside line over the centre line.
Then the right hand side over the centre line—back to the left side and repeat.
Always work from the outside to the centre, alternating. Complete this process for about 100 mm.
Then count the plaits on the right hand side—25 is a reliable number.
With the tail end prepare a half hitch and pull tight.
Make a loop and with the aid of a clothes peg, hold the tail end over your plaited line.
Starting again from the left, complete another six plaits.
Remove the dead weight and thread the main loop through the new loop and replace the deadweight.
Use some lubricant over the new plaited area and remove clothes peg and pull the tail end tight. (Pliers may help).
The examples provided above are not intended to be limiting. The inventor foresees that the fishing jig as described above may be used to form any number of different knots, those that are currently known in the art, and those which may develop in the future. The method of use should not be limited to the examples provided in the specification, which are given by example only.

Aspects of the present invention have been described by way of example only and it should be appreciated that modifications and additions may be made thereto without departing from the scope thereof.

What I claim is:

1. An apparatus for use in the preparation of a knot in at least one length of material, the apparatus comprising:
   a base portion including:
   a) a loop former configured in use to form a loop in the length of material when the length of material is engaged with the loop former;
   b) at least one restraining device, wherein the restraining device, in use, is configured to restrain the loop formed on the loop former, wherein the loop former and/or the at least one restraining device are configured to allow at least one portion of the loop formed on the loop former to substantially overlap with another portion of the loop;
   a twister configured to intercept and twist the overlapped portions of the loop formed in the loop former; and
   a hooking device.

2. The apparatus as claimed in claim 1 wherein the loop former includes an internal recess configured to allow the loop in the length of material to be internally accessible when wound around the loop former.

3. The apparatus as claimed in claim 1 wherein the hooking device has an elongate body portion with a hook-shaped head.

4. The apparatus as claimed in claim 1 wherein the hooking device is configured to be able to pass through the twister.

5. The apparatus as claimed in claim 1 wherein the base portion includes a recess configured to extend into the base and at least partially bisect the loop former.

6. The apparatus as claimed in claim 1 wherein the loop former is configured to be internally accessible.

7. The apparatus as claimed in claim 1 wherein the loop former includes a plurality of protrusions.

8. The apparatus as claimed in claim 7 wherein the loop former includes three protrusions spaced apart in a substantially triangular configuration.

9. The apparatus as claimed in claim 7 wherein the protrusions are cylindrical-shaped pegs.

10. The apparatus as claimed in claim 1 wherein the restraining device is a clamp.

11. The apparatus as claimed in claim 1 wherein the base portion includes two clamps.

12. The apparatus as claimed in claim 11 wherein the clamp includes a rotatable head portion and a locking portion.

13. The apparatus as claimed in claim 1 wherein the apparatus includes an extension device configured to be attached to the apparatus.

14. The apparatus as claimed in claim 13 where the extension device includes at least one protrusion configured to engage a portion of the length of material.

15. The apparatus as claimed in claim 14 wherein the protrusion in the extension device has a cross-sectional width of approximately 2.25 mm.

16. The apparatus as claimed in claim 14 wherein the extension device includes a raised platform beneath the protrusion, wherein the raised platform includes at least one linear groove which passes substantially adjacent to the protrusion on the extension device.

17. A method of forming a knot in a length of material, utilising the apparatus as claimed in claim 1, comprising the steps of:
   (a) winding a length of material around a loop former to form at least one loop such that the material extends on either side of the loop former;
   (b) restraining the length of material external to the formed loop on at least one side of the loop former with a restraining device,
   (c) twisting two adjacent lengths of material in the loop using the twister to form a twisted portion in the two lengths of material,
   (d) releasing a portion of the loop from the loop former,
   (e) drawing the released portion of the loop through the twisted portion with the hooking device,
   (f) releasing the remainder of the loop from the loop former,
   (g) drawing the remainder of the loop through the twisted portion; and
   (h) pulling the loop to form a knot.

18. The method as claimed in claim 17 wherein an extra fishing line is introduced before step a).

19. The method as claimed in claim 17 wherein step b) includes restraining the fishing line at both ends of the loop using two restraining devices.

20. The method as claimed in claim 17 wherein step d) includes rotating the twister 4 to 14 times.

21. The method as claimed in claim 17 wherein step d) includes rotating the twister 8-10 times, if the length of material is braid.

22. The method as claimed in claim 17 wherein step d) includes rotating the twister 6-8 times, if the length of material is nylon.

23. An apparatus for use in the preparation of a knot in at least one length of material, the apparatus comprising:
   a base portion including:
   a) a loop former configured in use to form a loop in the length of material when the length of material is engaged with the loop former;
   b) at least one restraining device, wherein the restraining device, in use, is configured to restrain the loop formed on the loop former;
   the loop former and/or the at least one restraining device are configured to allow at least one portion of the loop formed on the loop former to substantially overlap with another portion of the loop; and
   wherein the apparatus includes a twister configured to intercept and twist the overlapped portions of the loop formed in the loop former, said twister being a substantially elongate tube with an internal cavity extending its elongate length.

* * * * *